3,131,133
PROCESS AND APPARATUS FOR TITRATING
Embrecht Barendrecht, Geleen, Netherlands, assignor to Stamicarbon N.V., Heerlen, Netherlands
Filed May 25, 1959, Ser. No. 815,592
Claims priority, application Netherlands May 29, 1958
9 Claims. (Cl. 204—1)

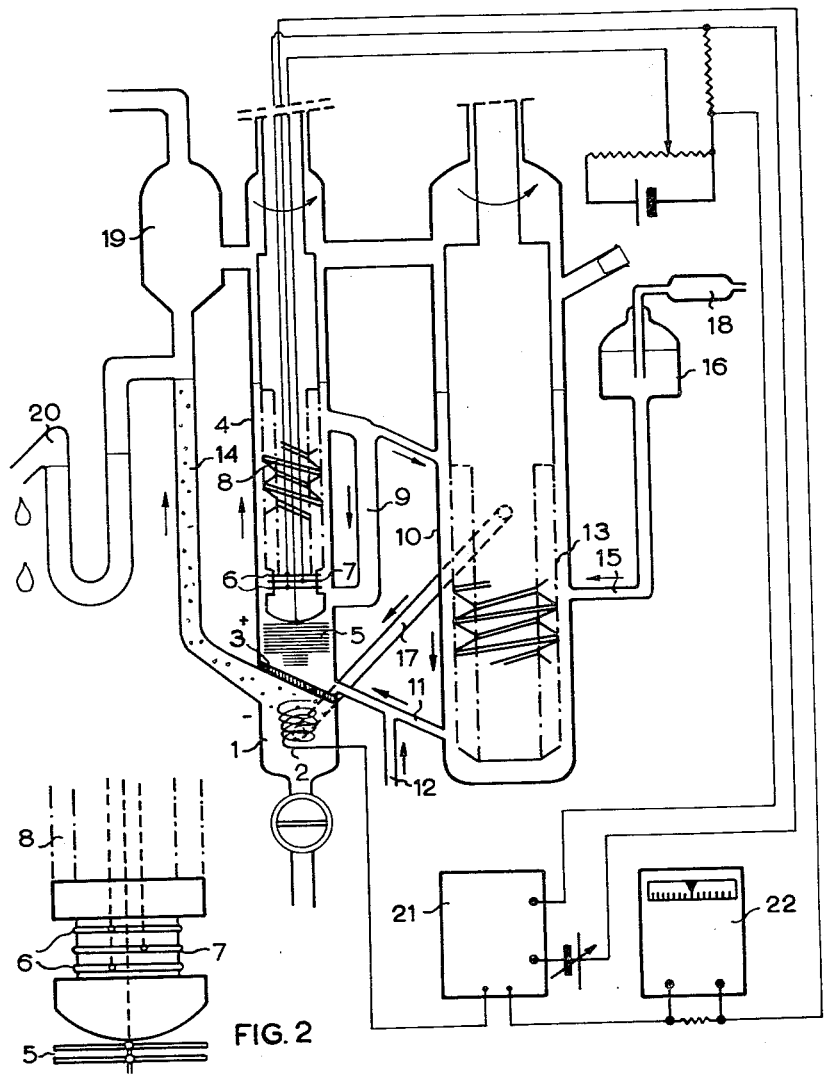

The invention relates to a novel process for carrying out titrations.

The invention also aims at providing a measuring cell with which the process according to the invention can be realized.

Up till now on suitable process has been disclosed by which a continuous titration can be performed.

For instance, it has been known since 1935 that water can be determined by means of a mixture of methanol, pyridine, sulphur dioxide and iodine. This mixture, in which the methanol may have been replaced by ethanol or e.g. by dioxane, and the iodine by bromine, is called "Karl Fischer reagent." Upon addition of this reagent to a water-containing sample an amount of sulphur dioxide equivalent to the amount of water is oxidized by the iodine, which enables the water content to be derived from the iodine consumption. Not only water, but also substances producing water e.g. acids reacting with methanol to form esters with evolution of water, can be determined with this reagent. In fact, such a titration amounts to a determination of water.

The principal object of the present invention is to provide a universal continuous automatic procedure for carrying out titrations which is of great importance in those cases where a quick measurement is desirable, e.g. for automatic processes.

A second object of the invention is the application of this process for determining water with a modified Karl Fischer reagent.

A third object of the invention is to provide a measuring cell for realizing the process according to the invention.

Other objects will also be apparent from the more detailed description of the invention given below.

Broadly stated, the foregoing principal object is realized, according to the invention, by leading a sample to be examined, or an extract thereof—mixed with a liquid if necessary—continuously through a measuring cell in which a product is generated by anodic oxidation or cathodic reduction, which product reacts with the substance to be determined in the said sample, or in an extract thereof, in so far as the said substance to be determined has not been converted by the aforementioned electrode processes, and establishing automatically the percentage of the substance to be determined.

This percentage might be determined by starting from a colorimetric measurement of the percentage of one or more of the components of the titration reaction. It is advantageous, however, to measure the percentage of one or more of these components amperometrically or potentiometrically, as this can be done in a simple, rapid and accurate way.

It is preferred to determine the percentage of the said component(s) by measuring the current between two indicator electrodes at constant potential difference. Within certain limits, which depend on the voltage difference and the dimensions of the indicator electrodes, the current is proportional to the percentage of the component(s), so that the measured current may be used for purposes of control.

It is recommendable to carry out the process according to the invention in such a way that the current between the indicator electrodes controls the generation of the product to be generated so as to ensure that the said current will remain constant or substantially constant, and the current between the generator electrodes is measured. The latter measured current is a measure of the percentage of the substance to be determined in the sample, provided this sample is supplied at a constant rate. This procedure makes it possible to determine also very small percentage, e.g. of one part by weight per million, in a solution with a relative accuracy of 5%.

At higher percentages the determination is even considerably more accurate. The value of the current between the two indicator electrodes should be so much greater than zero, e.g. 10 $\mu a.$, that not only rises but also falls in this current, corresponding e.g. with falls and rises in the percentage of the substance to be determined, will be capable of supplying the impulses needed for controlling the generator current.

It is advantageous seeing to it that a portion of the mixture that has passed the two indicator electrodes is returned into the measuring cell. In this way it is achieved that an equal consumption of the mixture in an otherwise identical apparatus, the distance between the generator working electrode and the indicator electrodes is traversed more quickly, with the result that oscillating of the generator current is limited. It is advantageous to feed the liquid back into the measuring cell at a point between the generator electrode and the indicator electrodes as this mixture—should its percentage of the component(s) to be measured be too low—will cause the indicator current to fall again and, in consequence, produce a rise in the generator current.

The foregoing second object is realized, according to the invention by using water for the substance to be determined and a Karl Fischer reagent containing an iodide or a bromide instead of iodine or bromine for the liquid.

It is preferred to use the iodide in the form of hydrogen iodide or a hydrogen iodide salt of an organic base. Fouling of the generator cathode, which would make the measurement unreliable after some time, can thus be prevented. This fouling may occur if an alkali iodide, e.g. KI, is used as the iodine source.

In those cases where the samples to be examined cannot be led through the measuring cell, a dry inert gas is passed through the sample, which inert gas subsequently delivers its water taken up to a water-free organic solvent, which is fed to the measuring cell.

The foregoing third object is realized, according to the invention, by separating the measuring cell into two compartments by a wall of semi-porous or porous material, e.g. sintered glass, the one compartment containing three electrodes, viz. one generator working electrode and two indicator electrodes of which three at least one is provided with means for enabling it to be rotated, while the other compartment contains one generator auxiliary electrode. The gas evolved during operation of the said auxiliary electrode can be removed from the said compartment without having the opportunity of penetrating through the semiporous or porous wall into the compartment in which the three other electrodes are contained. The partition wall moreover prevents a generated substance from being reduced or oxidized. Only by causing one of the three electrodes contained in the same compartment to rotate is it possible to mix the generated substance with the rapidity required for achieving a smooth control.

Preferably all three electrodes contained in the one compartment are provided with means for enabling them to be rotated, the indicator electrodes being placed as nearly as possible in an equipotential plane of the current field of the generator electrodes. The result of this is that the indicator current remains very constant and also that this weak current is hardly, or not, influenced by the much stronger current field of the generator electrodes, notwithstanding the generator working electrode is mounted in the immediate vicinity of the indicator electrodes with the object of obtaining a generator current with little oscillation.

Fluctuations in the indicator current are difficult to avoid if the electrodes are arranged side by side in the same plane. A very suitable solution to this difficulty is the use of indicator electrodes formed by closed rings, one of the said electrodes being constituted by two rings placed on either side of the other electrode.

Fluctuations in the indicator current can also be suppressed by fitting the indicator electrodes in a constriction in the carrier of the electrodes.

It is recommendable seeing to it that the three rotatable electrodes are mounted on one shaft which should also carry a worm, and that the measuring cell is provided with a by-pass line through which the mixture can be reintroduced into the measuring cell at a point intermediate between the generator working electrode and the indicator electrodes. With this measuring cell sudden changes in the composition of the sample are rapidly manifested, while the current between the indicator electrodes is not appreciably influenced by the field of the generator electrodes.

It is recommendable for the compartment in which the generator auxiliary electrode is contained to be included in the discharge circuit for the mixture. This measure ensures that also in this compartment the liquid will be constantly replaced.

The invention will now be elucidated with reference to the annexed sheet of drawings in which a diagram of an embodiment of the measuring cell according to the invention is represented in FIGURE 1. FIGURE 2 shows a detail of the indicator electrodes.

Compartment 1 of the measuring cell, which contains a platinum generator auxiliary electrode 2, is separated by a slanting, sintered glass plate 3, from the other compartment 4, which contains three rotary platinum electrodes, viz. a generator working electrode 5, two indicator electrodes 6 and 7, and a worm 8. Compartment 4 of the measuring cell is provided with a short by-pass line 9 through which liquid, issuing from the measuring cell, can be fed back into the measuring cell at a point between generator working electrode 5 and the indicator electrodes 6 and 7. The measuring cell is also provided with a large by-pass line 10 through which the liquid, in combination with a sample to be supplied through a capillary 12, is fed back via a capillary 11. The large by-pass line 10, which contains a rotary worm 13, is connected with compartments 1 and 4 of the measuring cell, and with a storage flask 16 by a capillary 5, and is provided furthermore with a discharge capillary 17. The liquid leaves the circuit via tube 17, compartment 1 of the measuring cell, tube 14 and U-tube 20. Storage flask 16 and tube 14 connect with the atmosphere via tubes 18 and 19 filled with a hygroscopic substance.

If desired, the measuring cell can be constructed in a simple manner by making bores in a block of plastic, e.g. polyethylene.

Using this preferred embodiment of the measuring cell, the process according to the invention for the determination of water by means of "Karl Fischer reagent" is carried out as follows. The sample is continuously led through tube 12 at a rate of say 20 ml. per hour. This sample is mixed with a larger amount of reagent, say 200 ml. per hour, issuing from the large by-pass line 10.

The reagent contained in storage flask 16 is prepared, for example, by taking 1 mol sulphur dioxide, 2 molar pyridine and 0.15 molar iodine in methanol and then adding so much water to the mixture until all of the iodine has been converted to iodide. On entering the measuring cell, the sample-reagent mixture reaches generator anode 5 which, just as the indicator electrodes 6 and 7 and worm 8, rotates at a speed of, say, 500 revolutions per minute. Generator anode 5 consists of a platinum wire with a total surface area of, say, 10 cm.$^2$ which is so coiled that the external diameter of the generator anode (about 13 mm.) is only slightly smaller than the internal diameter of the measuring cell (about 15 mm.). Between generator cathode 2 and anode 5 such a voltage difference is applied that the generator current will not exceed 300 ma. The hydrogen produced at generator cathode 2 issues from the measuring cell via the tubes 14 and 19 without interfering with the electrical contact between compartments 4 and 1 of the measuring cell.

At generator anode 5 iodine is produced, which is rapidly mixed with the sample-reagent mixture flowing along the side anode and reacts with the water present in the sample. This reaction proceeds fairly rapidly, through not momentaneously. The resulting, partly reacted mixture, subsequently arrives at the likewise rotating indicator electrodes 6 and 7, which have a surface area of about 0.5 cm.$^2$, between which a voltage difference of about 25 mv. is maintained. The current between these indicator electrodes, hereinafter to be called indicator current, is measured by an electronic controlling device 21 which, if the said current falls to below a given value, say 10 $\mu$a., commands an increase in voltage difference between generator electrodes 2 and 5, with the result that more iodine is generated. Conversely, rises in indicator current result in a decrease in iodine production. In this way the indicator current is kept constant, or substantially constant, while the generator current provides a measure of the moisture content of the sample. If desired, this generator current may be recorded automatically (instrument 22), or be used for controlling the process by which the sample is produced. The rotating worm 8 ensures a rapid flow in the measuring cell so that the sample-reagent mixture will rapidly travel the distance between generator anode 5 and indicator electrodes 6 and 7 (about 5 mm.). The mixture issuing from the measuring cell is largely fed back through the small by-pass line 9, with the result that a reduction in iodine concentration—caused by a sudden increase in the water percentage of the sample—rapidly brings about a reduction in the indicator current and hence a rapid rise in the generator current. In this way practically the whole water percentage of the sample is reflected fairly rapidly in the measured generator current.

The other portion of the mixture issuing from the measuring cell is fed into the large by-pass line 10, which receives e.g. 20 ml./h. of fresh reagent through tube 15 and, consequently, delivers 40 ml./h. of reagent through tube 17.

It is possible to deviate on many points from the device outlined above. For example, the generator working electrode and the couple of indicator electrodes may be mounted on different shafts, provided only it is seen to that the distance from the generator electrode to the indicator electrodes is covered quickly and that, nevertheless, the current field of the indicator electrodes is not, or only slightly, disturbed by the current field of the generator electrode.

What is claimed is:

1. A process for continuously determining the amount of water in a material to be examined which comprises providing a measuring cell having a pair of generator electrodes and a pair of indicating electrodes, feeding into the cell a Karl Fischer reagent containing a member of the group consisting of iodide and bromide, providing a voltage between said generator electrodes and generating by anodic oxidation therebetween a product selected from the group consisting of iodine and bromine which reacts with the water to be determined, continuously passing said material into said cell and mixing the same with said generated product, thereafter passing the resulting mixture past said indicator electrodes, measuring the current between said indicator electrodes as said mixture is passed thereby, regulating the current between said generator electrodes and the amount of product generated thereby by maintaining the current between said indicator electrodes substantially constant, continuously removing the mixture from said cell after it has passed said indicator electrodes, recycling past said indicator electrodes at least a portion of the removed mixture and continuously measuring the current between said generator electrodes to determine the amount of water in said material.

2. The process of claim 1 wherein the recycled portion is fed back into said cell at a point between said indicating electrodes and said generator electrodes.

3. The process of claim 1 wherein the iodide in said reagent is present as a compound selected from the group consisting of hydrogen iodide and hydrogen iodide salt of an organic base.

4. Apparatus for continuously determining the amount of water in a material to be examined which comprises a measuring cell separated into first and second compartments by a partition wall of at least semi-porous material, said first compartment containing a generator working electrode and two indicator electrodes, means for rotating at least one of said electrodes, a generator auxiliary electrode in said second compartment, means for continuously passing a Karl Fischer reagent containing a member of the group consisting of iodide and bromide between said generator electrodes to generate a product selected from the group consisting of iodine and bromine, means for removing gas produced at said generator auxiliary electrode from said second compartment, means for passing the material containing said water into said first compartment for admixture and reaction with said product, means for continuously passing the resulting mixture past said indicator electrodes and for withdrawing same from said cell, means for continuously returning a portion of said mixture into said first compartment at a point between said generator working electrode and said indicator electrodes, means operable by the current between said indicator electrodes for continuously adjusting the current between said generator electrodes and the amount of product generated therebetween, and means for continuously measuring the current between said generator electrodes as a function of the amount of water in said material.

5. Apparatus according to claim 4, wherein all three electrodes contained in the one compartment are provided with means for enabling them to be rotated, the indicator electrodes being placed as nearly as possible in an equipotential plane of the current field of the generator electrodes.

6. Apparatus according to claim 5, wherein the indicator electrodes comprise closed rings, one of the said electrodes being constituted by two rings, one of said two rings being placed on each side of the other electrode.

7. Apparatus according to claim 5, wherein the indicator electrodes are fitted in a constriction in the carrier of these electrodes.

8. Apparatus according to claim 4, wherein the three rotatable electrodes are mounted on one shaft which also carries a worm.

9. Apparatus according to claim 8, wherein the compartment containing the generator auxiliary electrode is included in the discharge circuit for the mixture.

References Cited in the file of this patent

UNITED STATES PATENTS

| 2,758,079 | Eckfeldt | Aug. 7, 1956 |
| 2,823,734 | Eckfeldt | Apr. 29, 1958 |
| 2,928,775 | Leisey | Mar. 15, 1960 |
| 2,954,336 | Grutsch | Sept. 27, 1960 |
| 3,005,758 | Spracklen et al. | Oct. 24, 1961 |

OTHER REFERENCES

Deford et al.: "Analytical Chemistry," volume 23, July 1951, pages 938–944.

Sease et al.: "Analytical Chemistry," volume 19, 1947, pages 197–200.

Symthe: "The Industrial Chemist," October 1957, pages 501–505.